No. 648,123. Patented Apr. 24, 1900.
C. P. GOERZ.
TELESCOPIC TRIPOD.
(Application filed Oct. 5, 1899.)
(No Model.)
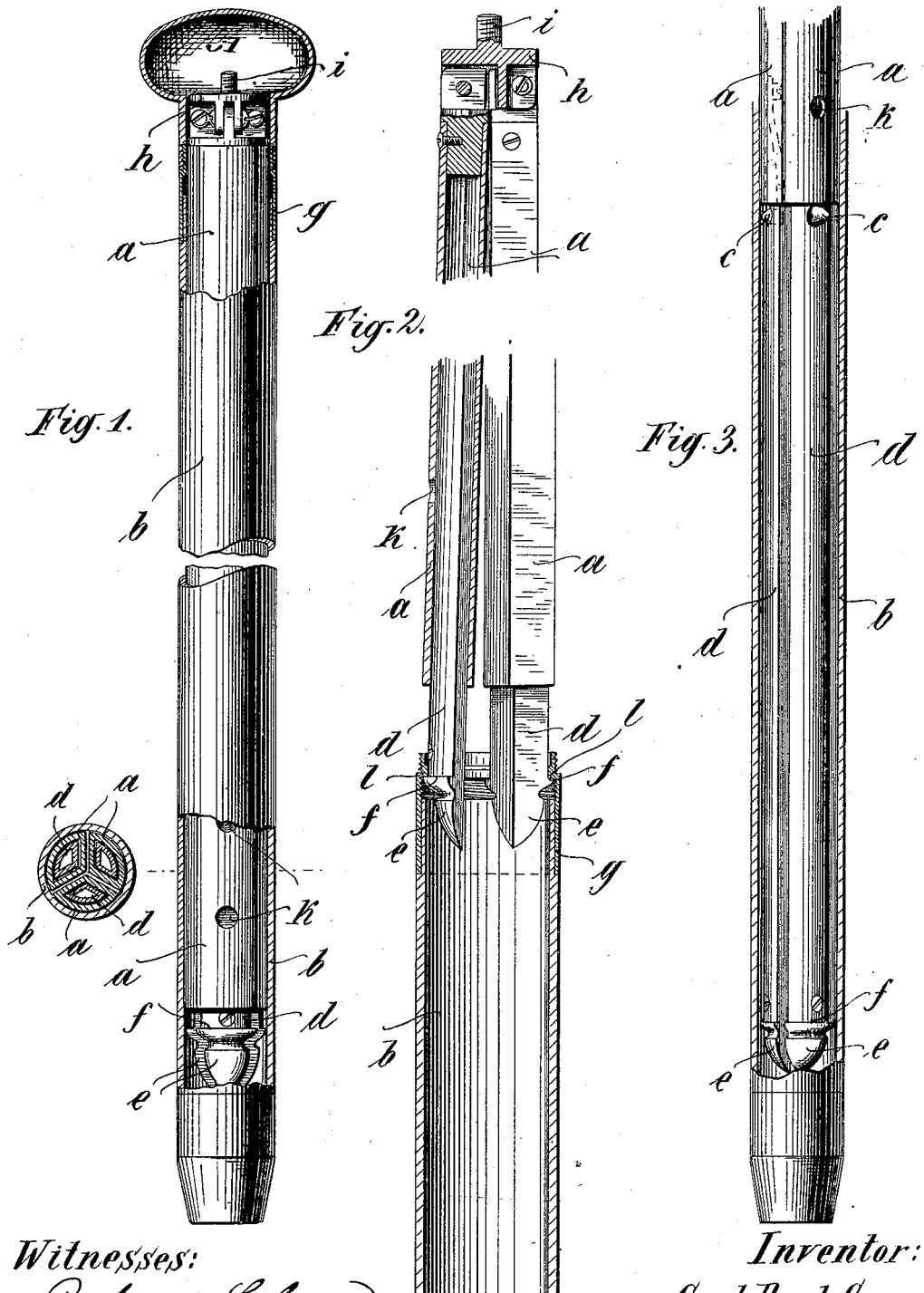
Witnesses:
Richard Scherpe
Curt Gsell
Inventor:
Carl Paul Goerz
by [signature]
Attorney.

UNITED STATES PATENT OFFICE.

CARL PAUL GOERZ, OF FRIEDENAU, GERMANY.

TELESCOPIC TRIPOD.

SPECIFICATION forming part of Letters Patent No. 648,123, dated April 24, 1900.

Application filed October 5, 1899. Serial No. 732,737. (No model.)

*To all whom it may concern:*

Be it known that I, CARL PAUL GOERZ, a citizen of the Kingdom of Prussia, and a resident of Rheinstrasse, Nos. 45 and 46, Friedenau, near Berlin, in the Kingdom of Prussia, German Empire, have invented certain new and useful Improvements in Tripods with Telescoping Legs, of which the following is a specification.

My invention relates to an improvement in tripods for photographic cameras and surveying and other instruments; and its object is to provide a tripod which can be closed in the form of an ordinary cane and which when wanted for use can be extended any desired length.

My invention consists in a bed, table, or platform to which three triangular-shaped tubes are pivotally connected at their upper ends, combined with three tubes of smaller diameter, which are slidably inserted in the pivoted tubes and are provided with pointed feet upon their lower ends and a receiving-case or hollow cane into which the tripod is inserted when not in use, as will be more fully described hereinafter.

In the accompanying drawings, Figure 1 is a side elevation of a tripod which embodies my invention, shown partly in section, and closed, so that it can be used like an ordinary walking-cane. Fig. 2 is an enlarged detail sectional view showing the parts partly extended. Fig. 3 is also an enlarged detail view, partly in section, showing the tubes which form the feet inserted their full length into the inclosing case and the pivoted tubes partly withdrawn.

The tripod itself consists of three metal tubes $a$, which are preferably of a triangular form and which when pressed together have their outer surface to form a circle. These tubes are pivotally connected to a table or platform $h$, provided with a screw $i$ upon its top to hold the instrument which is to be placed thereon. When the tripod is not in use, the table or platform $h$ is inclosed in the hollow head A of the casing $b$, which can be used as a walking-cane and in which the entire tripod is inclosed.

Placed slidably inside of the three tubes $a$ are the three similarly-shaped tubes $d$, which are provided near their upper ends with the points or projections $c$, which are spring-actuated, so as to be movable back and forth through the openings through which they project and are adapted to catch in the holes $k$ in the tube $a$ when the legs have been extended. These projections serve to prevent the tubes $a$ and $d$ from becoming entirely separated. As there are a series of these holes $k$ the height of the tripod is easily regulated by having the projection catch in any desired one of the openings. The lower ends of the tubes $d$ have formed therein or detachably secured thereto the pointed feet $e$, which engage with the ground or whatever surface upon which they are placed, so as to hold the tripod against all possibility of slipping. At the tops of these feet are formed shoulders $f$, which are intended to engage with corresponding shoulders $l$, formed near the upper end of the cap or tube $g$, which is slipped over the upper end of the casing $b$. The tubes $d$ have a tendency to spring apart, as shown in Fig. 2, owing to their being crowded or forced closely together, and hence as the tripod is being drawn out of the casing $b$ these shoulders catch behind the shoulders $l$ and resist removal from the casing until the tubes $a$ have been drawn outward over the tubes $d$ the desired distance. As soon as the tripod has been extended it is only necessary to move the lower ends of the tubes $d$ toward each other, when the shoulders become disengaged, and then the case $b$ can be laid aside until the tripod has been used.

By means of my construction the entire tripod can be shortened and folded so that it can be placed inside of a casing which resembles an ordinary walking-cane. By having the shoulders upon the tubes $d$ engage with the corresponding shoulder upon the casing $b$ the tripod can be more quickly extended than could be done where the tubes $d$ had to be separately drawn outward after the tripod was removed from the frame.

Having thus described my invention, I claim—

1. In a tripod, a table or support, tubes pivotally connected thereto at their upper ends, and tubes placed inside of the pivoted tubes and provided with shouldered feet, combined with a casing in which the tripod is placed when closed and which casing is provided with a shoulder to engage with a shoulder upon the feet, substantially as set forth.

2. In a tripod, a frame, or platform provided with a screw to receive the instrument to be placed thereon, the three triangular-shaped tubes pivotally connected thereto at their upper ends, and the correspondingly-shaped tubes $d$ placed in the tubes $a$ and provided with shouldered feet, and means for connecting the two tubes in any desired relation to each other, combined with a casing $b$ provided with a shoulder near its upper end, and a head A which closes the casing after the tripod has been inserted, substantially as shown and described.

In testimony whereof I affix my signature in presence of two witnesses.

CARL PAUL GOERZ.

Witnesses:
  WOLDEMAR HAUPT,
  HENRY HASPER.